(12) United States Patent
Huo et al.

(10) Patent No.: US 12,455,756 B2
(45) Date of Patent: Oct. 28, 2025

(54) DYNAMIC CONNECTION SWITCHING IN VIRTUAL DESKTOPS UNDER NESTED MODE

(71) Applicant: Omnissa, LLC, Mountain View, CA (US)

(72) Inventors: Huiyong Huo, Beijing (CN); Zhongzheng Tu, Beijing (CN); Mingsheng Zang, Beijing (CN); Weigang Huang, Beijing (CN); Yueting Zhang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 849 days.

(21) Appl. No.: 17/671,608

(22) Filed: Feb. 15, 2022

(65) Prior Publication Data

US 2023/0205566 A1    Jun. 29, 2023

(30) Foreign Application Priority Data

Dec. 29, 2021    (WO) ................ PCT/CN2021/142402

(51) Int. Cl.
*G06F 9/451* (2018.01)
*G06F 9/455* (2018.01)

(52) U.S. Cl.
CPC .......... *G06F 9/45558* (2013.01); *G06F 9/452* (2018.02); *G06F 9/45545* (2013.01);
(Continued)

(58) Field of Classification Search
CPC .. G06F 9/45558; G06F 9/452; G06F 9/45545; G06F 2009/45575; G06F 2009/45595
See application file for complete search history.

(56) References Cited

U.S. PATENT DOCUMENTS

| 7,673,056 B1* | 3/2010 | Inbaraj ................. H04L 67/563 |
| | | 709/227 |
| 2009/0006537 A1* | 1/2009 | Palekar ................. H04L 67/133 |
| | | 709/203 |

(Continued)

*Primary Examiner* — April Y Blair
*Assistant Examiner* — Jonathan R Labud
(74) *Attorney, Agent, or Firm* — Kim & Stewart LLP

(57) ABSTRACT

System and method are described for dynamically switching redirection of features between a first and a second virtual desktop that are accessed by a client in nested mode. To connect to the desktops in the nested configuration, the client can establish a first session on the first virtual desktop and then establish a session on the second virtual desktop within the first desktop. A connection can be established between the client and an agent in the first desktop for exchanging feature redirection data corresponding to a feature such as USB, clipboard, etc., and the feature can subsequently be redirected to the first desktop by exchanging corresponding data over the connection. A request can be received to switch the feature redirection to the second desktop. In response to the request, the client can establish a connection for redirecting the feature with an agent in the second desktop and the feature can be subsequently redirected to the second desktop by exchanging corresponding data over the new connection. As a result, feature redirection can be switched between desktops dynamically without terminating either virtual desktop session.

17 Claims, 13 Drawing Sheets

(52) U.S. Cl.
CPC .............. *G06F 2009/45575* (2013.01); *G06F 2009/45595* (2013.01)

(56) References Cited

U.S. PATENT DOCUMENTS

| | | | |
|---|---|---|---|
| 2012/0324365 A1* | 12/2012 | Momchilov | G06F 3/14 |
| | | | 715/738 |
| 2017/0003995 A1* | 1/2017 | Hu | G06F 9/45558 |
| 2017/0111455 A1* | 4/2017 | Raju | H04L 67/141 |
| 2017/0318112 A1* | 11/2017 | Johnsimon | G06F 9/00 |
| 2017/0339234 A1* | 11/2017 | Vajravel | H04L 67/145 |
| 2021/0014334 A1* | 1/2021 | Sun | G06F 21/6218 |

* cited by examiner

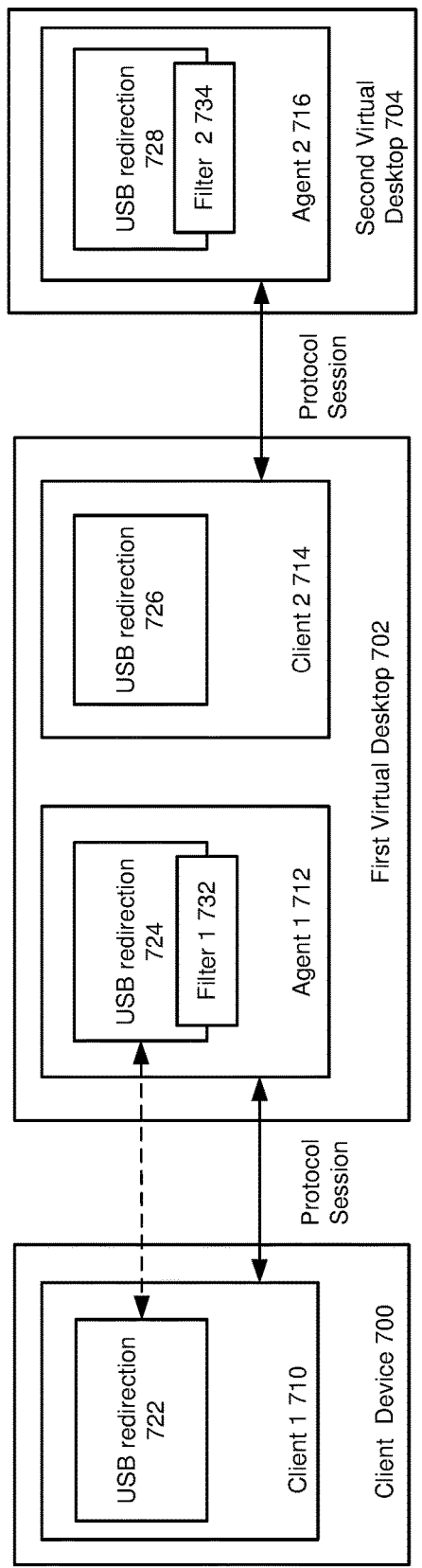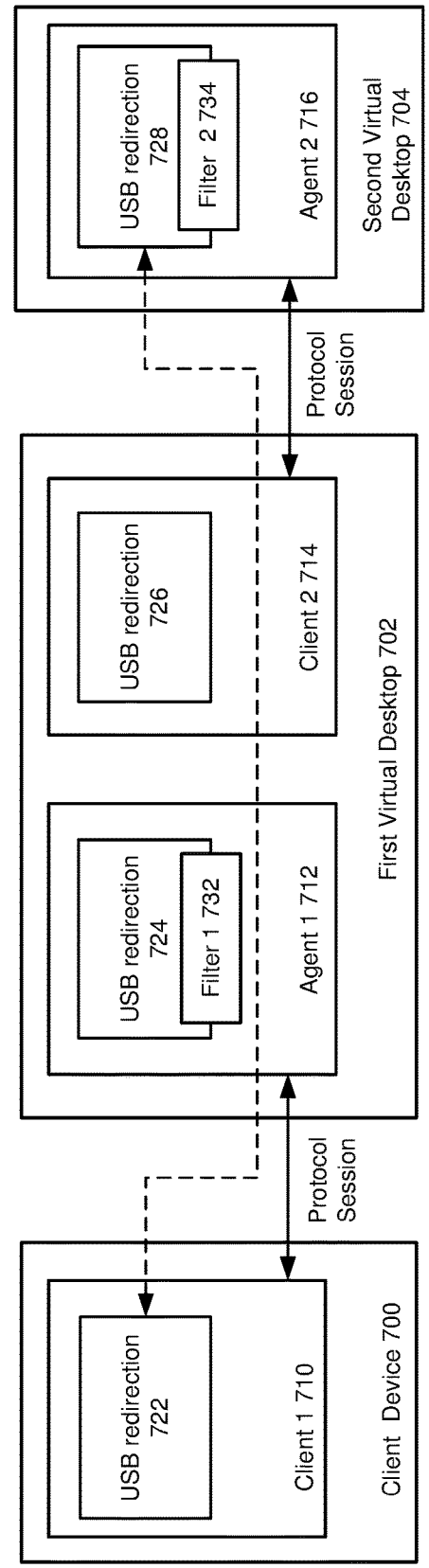
FIG. 7A
FIG. 7B

DYNAMIC CONNECTION SWITCHING IN VIRTUAL DESKTOPS UNDER NESTED MODE

CLAIM OF PRIORITY

This application is based upon and claims the benefit of priority from International Patent Application No. PCT/CN2021/142402, filed on Dec. 29, 2021, which is incorporated by reference herein in its entirety.

TECHNICAL FIELD

The present disclosure generally relates to virtual desktops and more specifically to techniques for efficiently accessing a second virtual desktop from a first virtual desktop via a nested mode.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

To utilize what is referred to as "nested" mode, a user who is accessing a first virtual desktop running on a server can access a second virtual desktop, which may run on yet another server, from the first virtual desktop. The user can do this by launching a virtual desktop client in the first virtual desktop and using the client to launch and connect to the second virtual desktop from within the first virtual desktop.

Using various features in a virtual desktop requires certain data and messages to be exchanged between the local client device and the virtual desktop. Printing from the virtual desktop, copying/pasting to the virtual desktop, accessing USB devices in the virtual desktop, and using a camera or microphone in the virtual desktop are just some examples of the various features that require data to be exchanged between the local machine and the virtual desktop. Hence, to enable these features, the local client device needs to exchange corresponding data and messages with the virtual desktop. Typically, this is performed by establishing one or more virtual channels between the client device and the virtual desktop, over which the data and messages are exchanged.

However, numerous challenges exist for enabling features in virtual desktops under nested mode. For example, in nested mode, a client device corresponds not only with the first virtual desktop but also with the second virtual desktop, via the first virtual desktop. Accordingly, enabling features in the desktops requires not only communication channels between the client device and each desktop over which feature data and messages can be exchanged, but also a way to manage and switch channels between desktops, particularly as the user transitions from using features in one desktop to using them in the other desktop under nested mode. An efficient approach for handling these tasks is lacking in existing technology. What is needed is a more efficient way for enabling use of features in virtual desktops under nested mode.

BRIEF DESCRIPTION OF THE DRAWINGS

FIG. 7A illustrates an example of a system for dynamic connection switching in virtual desktops under nested mode implementing a filter, in accordance with various embodiments.

FIG. 7B illustrates an example of a system for dynamic connection switching in virtual desktops under nested mode implementing a filter to redirect a USB device to the second virtual desktop, in accordance with various embodiments.

DETAILED DESCRIPTION

Figure 1:
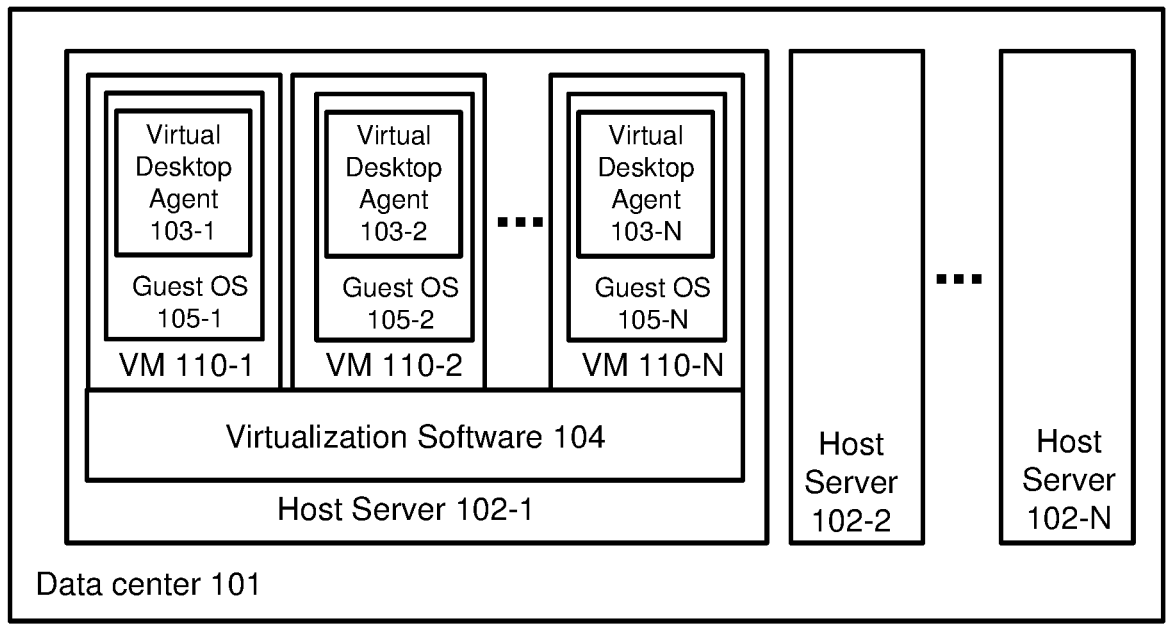
FIG. 1 illustrates an example of a virtual desktop environment, in accordance with various embodiments.
Figure 1:
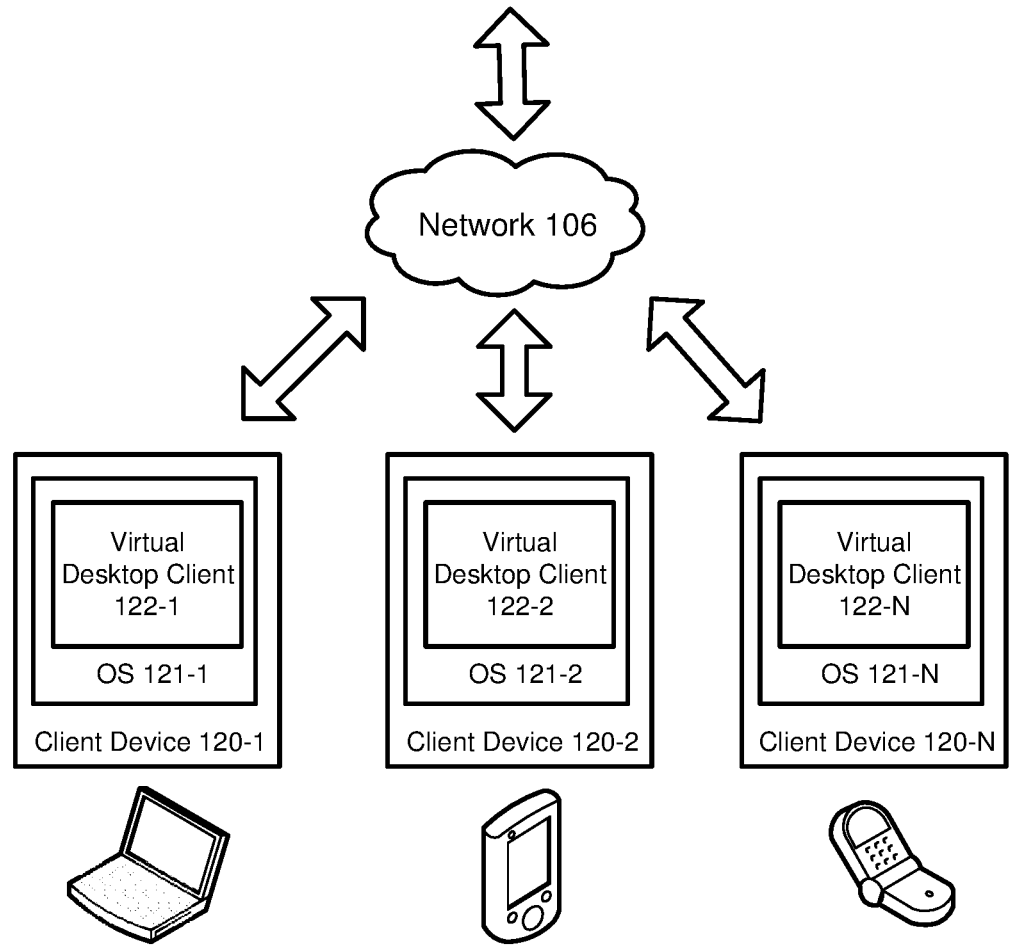

Systems and methods in accordance with various embodiments of the present disclosure overcome at least some of the above-mentioned shortcomings and deficiencies by providing more efficient ways to switch connections between virtual desktops in nested mode for enabling feature redirection in the desktops. In particular, embodiments described herein leverage a mechanism implemented in a nested mode configuration where a client device accesses a second desktop through a first desktop, which provides for dynamic switching between data channels used for feature redirection during operation of the desktops.

The process can begin by establishing a first virtual desktop session between a first virtual desktop client operating on a client computing device and a first virtual desktop agent operating in a first virtual desktop on a host server. For example, this can be performed by a user opening a client on their user device and launching and connecting to the first virtual desktop using the client. After the first virtual desktop session is established, a second virtual desktop session can be initiated between a second virtual desktop client operating in the first virtual desktop and a second virtual desktop agent operating in the second virtual desktop. For example, this can be performed by the user opening the second client in the first virtual desktop, and then launching and connecting to the second virtual desktop using the second client. This type of configuration, where a virtual desktop client running within a virtual desktop is used to connect to another virtual desktop is referred to herein as "nested mode".

When the first virtual desktop is established, one or more connections such as virtual channels can be formed between the client on the user device and the agent in the first virtual desktop on the host server for exchanging various data between the client and the agent. For example, interactions between the user and the first virtual desktop can involve not only the exchange of basic data such as keyboard and mouse inputs sent to the virtual desktop and display information that is received by the client back from the desktop, but various other data that may be necessary to enable certain features and capabilities in the virtual desktop. Examples of such features are copying and pasting between the local device and the remote desktop, which can require exchanging the copy and paste data between the local machine and the remote desktop; printing a document from the remote desktop, which may require sending the printed document data from the remote desktop to the local device; using a USB device attached to the local device in the remote desktop, which can require exchanging data used by the USB device between the local machine and the remote desktop; and so on.

This process of conveying data required by a feature from a client device (e.g., by a client running on a client device) to a virtual desktop (e.g., to an agent running in a virtual desktop) or from the virtual desktop to the client is referred to herein as "redirection". For example, a USB device that is attached to the local client device can be redirected to the virtual desktop so that the USB device can be accessed in the virtual desktop. Similarly, a printer that is physically attached to the local client device can be redirected to a virtual desktop so that the user can print a document from the virtual desktop on the printer. Other peripheral devices such as a microphone and a video camera can also be redirected to the virtual desktop. Various other features can likewise be redirected in virtual desktops, which may or may not correspond to peripheral devices, as will be described further below.

Thus, after the session on the first virtual desktop is established, one or more connections can be formed, over which data such as data used for redirection of features can be exchanged. When the second virtual desktop session on the second virtual desktop in nested mode is established, redirection of features to the second virtual desktop can likewise be performed by exchanging data over connections that are established between the client on the user device and the agent in the second virtual desktop. As will be described in further detail below, the client on the user device and the agent in the second desktop can connect via a bridge in the first virtual desktop.

Accordingly, in nested mode, features can be redirected between the client on the user device and either the first desktop or the second desktop. However, in many cases, a feature may need to be redirected to one desktop and not the other. For example, a user may need to redirect a feature (e.g., a USB device) to one of the desktops being accessed in nested mode and not to the other. Further, feature redirection may need to be switched from one desktop to the other desktop during operation of the desktops under nested mode. For example, the user may initially wish to redirect a feature (e.g., a USB device) to the first desktop and then need to switch and redirect it to the second desktop.

In various embodiments, when a client accesses two desktops under nested mode, feature redirection can be dynamically switched from one desktop to the other desktop while the desktops are running, utilizing a connection switching mechanism. A connection can be established between the client and the agent in the first desktop, e.g., for exchanging feature redirection data for a feature. The feature can then be redirected to the first desktop by exchanging corresponding data over the connection. A request can be received to switch the feature redirection to the second desktop. For example, the request can be initiated by a user providing an input indicating that the feature (e.g., USB, printer, microphone, etc.) is to be redirected to the second virtual desktop. When the request is received, the client can establish a connection for the feature redirection with the agent in the second desktop and the feature can be subsequently redirected to the second desktop by exchanging corresponding data over the new connection. During the switch, the connection for the feature with the first virtual desktop can be terminated.

Subsequently, if a request is received to switch redirection back to the first desktop, the feature redirection connection can be switched back to the first desktop and the feature can once again be redirected to the first desktop. In this way, features can be redirected to either desktop and be switched dynamically between them during operation of the desktops.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user can view the GUI of the remote desktop and interact with it as if the desktop was running on the local client device, even though the desktop is actually executing remotely.

In some cases, instead of providing a user with access to a full desktop session, i.e., where the user gets to see and interact with substantially the entire remote computing environment (e.g., the entire operating system, all applications, settings, etc., of the remote virtual machine), the user can be given access to a limited portion of the desktop or to a certain application or applications on the desktop, so that the user is able to see and interact with the limited portion or certain application(s) and not with other parts of the virtual desktop, which can be hidden from the user. This approach is preferable, for example, when an enterprise wishes to deliver access to a particular application to users, without giving access to the remainder of the computing environment where the application runs. This type of session may be referred to as a "virtual application", "remote application", or an "application session" throughout this disclosure and these terms may be used interchangeably. Hence, with a virtual application, the application can run inside a remote desktop but look and feel to the user on his or her client device as if only the application is executing. Behind the scenes, however, the application can be running inside a desktop session, but only the application's user interface (UI) may be visible and accessible to the user on the client device. As in a full desktop session, with virtual applications user inputs can be conveyed from the client device to the remote desktop and redirected to the operating system (OS) of the remote desktop, so that the OS can deliver the inputs to the application, while the GUI of the application is streamed back and displayed on the client device. It should be understood that the term "virtual desktop", as used herein, can apply to cases where access is provided to the substantially entire desktop as well as to cases where access is limited to certain portions of the remote computing environment, such as in the case of virtual applications.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
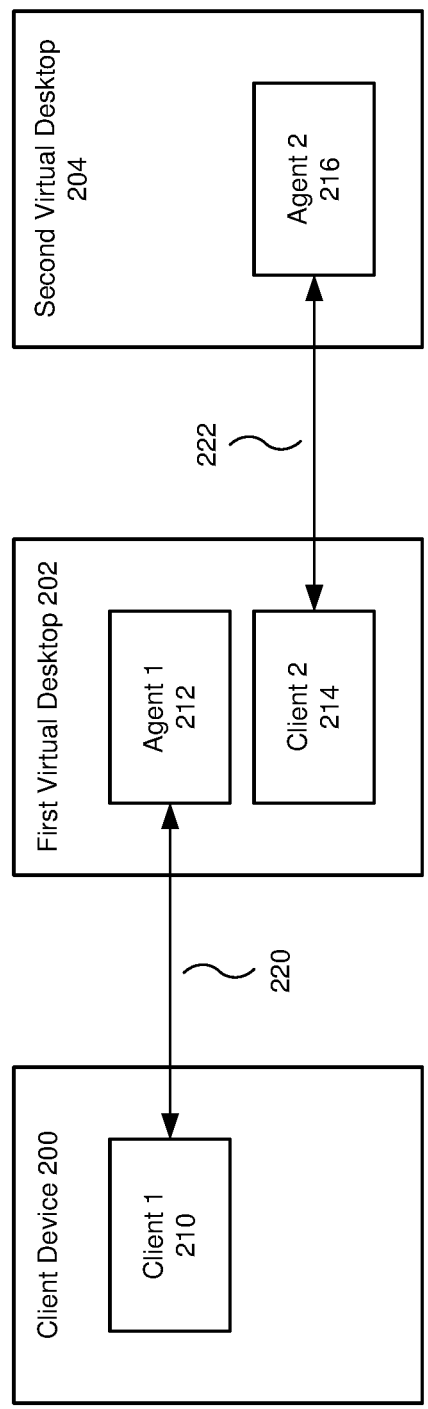
FIG. 2 illustrates an example of virtual desktop nested mode, in accordance with various embodiments.

FIG. 2 illustrates an example of virtual desktop nested mode, in accordance with various embodiments. As illustrated in the example of FIG. 2, client 1 210, which may be any kind of virtual desktop client, can operate on a client device 200. A user of the client device 200 can use client 1 210 to connect to virtual desktop agent 1 212, running in a first remote desktop 202, which can be a virtual desktop or a published desktop running on a remote server. Examples of virtual desktop clients and remote desktop products are VMware Horizon desktop and application virtualization products available from VMware, Inc.

After the remote desktop session on the first virtual desktop 202 is established, a second virtual desktop client, client 2 214 can be launched inside the first virtual desktop 202. For example, the user can launch client 2 214 in the first virtual desktop 202. Client 2 214 can then connect to a second virtual desktop agent 216 running in a second virtual desktop 204 (which may be a virtual desktop or a virtual application) from the first virtual desktop 202.

This way, client 1 210 can establish a first desktop session with the first virtual desktop 202 and client 2 214 can establish a second desktop session with the second virtual desktop 204. The user can then access the second virtual desktop 204 from the client device 200 by making inputs into client 2 214 running in the first virtual desktop 202, via client 1 210 running on the user's client device 200. The user may be able to view the GUI of the second desktop 204 in the GUI of the first desktop 202. For example, the second virtual desktop 204 GUI can be streamed to the first desktop 202 and be presented in the GUI of the first desktop 202 (e.g., in a window). The first desktop 202 GUI, which can now contain the GUI of the second desktop 204, can then be streamed to the client device 200 and displayed to the user.

In various embodiments, data can be exchanged between client 1 210 and agent 1 212 in the first desktop 202 via one or more virtual channels 220, which may be any type of connections such as protocol virtual channels (e.g., remote desktop protocol (RDP) channels). Similarly, data can be exchanged between client 2 214 in the first virtual desktop 202 and agent 2 216 in the second desktop 204 via one or more virtual channels 222, which may also be connections such as protocol virtual channels. The data exchanged over the channels 220, 222 can include user inputs (e.g., mouse and keyboard inputs), screen data (GUI pixel data), as well as data required to enable various features in the virtual desktop 202, 204 such as printing, USB access, copying/pasting, etc., as will be described further below.

In various embodiments, the virtual channels 220, 222 can be any logic communication channels between the client 210, 214 and the agent 212, 216. For example, in the VMware Horizon infrastructure, two kinds of virtual channel technology can be utilized. One is the PCoIP (PC over IP) virtual channel and the second one is the VMware virtual channel.

Take the PCoIP protocol as an example to illustrate the virtual channel in the Horizon infrastructure. A PCoIP virtual channel can serve as an extension or plugin of the PCoIP protocol. This can allow a Horizon client and a Horizon agent to define and implement their own logic protocol to exchange data. This way, PCoIP can be utilized as the transportation protocol. Further, multiple channels can be served via multiplex over the PCoIP data transfer channel.

As mentioned, in virtual desktops such as the virtual desktops 202, 204 of FIG. 2, the interactions between end-users and the remote agents (e.g., 212, 216) include not only the basic keyboard, mouse, and remote screen display functionality but also various features, referred to herein as "remote experience features", such as clipboard data sync, remote feature redirection (e.g., RTAV (Real-Time-Audio-Video) and MMR (Multimedia Redirection)), local peripherals redirection (e.g., USB devices, printers, etc.) and so forth. In various embodiments, such remote experience features can use the virtual channel to exchange necessary data between the client (e.g., 210, 214) and the agent (e.g., 212, 216).

For example, if a user copies data on the client device 200 (e.g., in an application) and wishes to paste it in the first virtual desktop 202 (e.g., in an application), then the copied data can be conveyed to the virtual desktop 202 over a virtual channel 220. Similarly, when data is copied from the virtual desktop 202 and pasted in the client device 200, the data can be conveyed over the virtual channel 220. In the same way, copy/paste data between the first virtual desktop 202 and the second virtual desktop 204 can be exchanged over the corresponding virtual channel 222. This redirection of copy and paste data between a client and a virtual desktop is referred to as clipboard redirection.

Other remote experience features can likewise utilize virtual channels (e.g., 220, 222) for transferring data. For example, for multimedia redirection, such as MMR, TSMMR, HTML5 multimedia redirection, and so on, encoded multimedia data can be conveyed over the virtual channels (e.g., 220, 222) between the client (e.g., 210, 2214) and the agent (e.g., 212, 216). For RTAV redirection, audio and video data can be conveyed over the virtual channels (e.g., 220, 222) to enable use of microphones and video cameras attached to the client 200 in the virtual desktop. Data for other peripheral devices, such as USB devices, can likewise be conveyed over the virtual channels (e.g., 220, 222). Printer data can be conveyed over the virtual channels (e.g., 220, 222), e.g., to enable printing on the client from a virtual desktop in printer redirection.

Certain past technologies, such as the VMware Horizon infrastructure, provide virtual desktops in which feature redirection is performed over virtual channels that are established when the desktop session is initiated and terminated when the session is ended. However, with these technologies, switching or resetting a virtual channel on a desktop required disconnecting and reconnecting the desktop session, creating inefficiencies and inconvenience. The embodiments provided herein provide a mechanism for dynamically switching connections in virtual desktops under nested mode, allowing for feature redirection to be switched from one desktop to the other desktop while the desktops are running, without the need to disconnect and reconnect desktop sessions.

Figure 3:
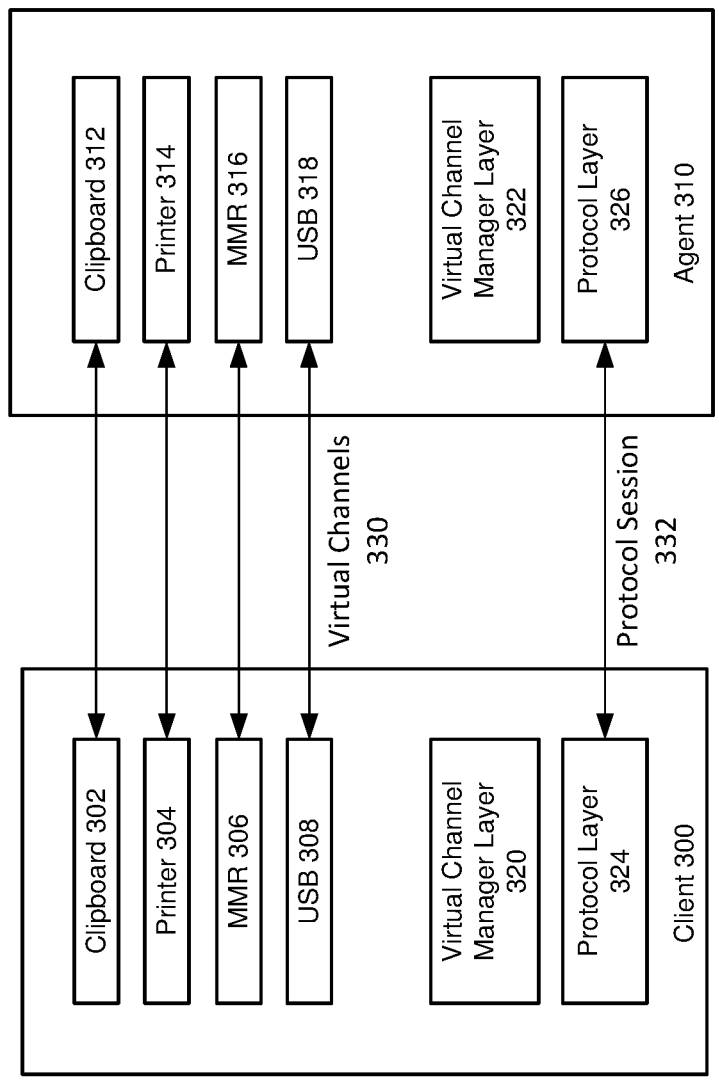
FIG. 3 illustrates an example of virtual channel connections between a virtual desktop client and agent, in accordance with various embodiments.

FIG. 3 illustrates an example of virtual channel connections between a virtual desktop client and agent, in accordance with various embodiments. As illustrated in the example of FIG. 3, a virtual desktop client 300 can be in communication with a virtual desktop agent 310 over a plurality of virtual channels 330. The client 300 can be either a client running on a client device (such as client 1 210 in the example of FIG. 2) or a client running in a virtual desktop that is connecting to another virtual desktop in nested mode (such as client 2 214 in the example of FIG. 2). The agent 310 can be either an agent running in a virtual desktop that is connected to a client device (such as agent 1 212 in the example of FIG. 2) or an agent running in a second virtual desktop that is connecting to a client running in a first virtual desktop during nested mode (such as agent 2 216 in the example of FIG. 2).

As illustrated, a protocol session 332 (e.g., RDP) can be established between a protocol layer 324 on the client 300 and a protocol layer 326 on the agent 310. A virtual channel manager layer 320 on the client 300 and a corresponding virtual channel manager layer 322 on the agent 310 can manage the exchange of information required by various features (e.g., remote experience features) over several virtual channels 330 between the client 300 and agent 310. For example, a clipboard feature module 302 on the client 300, which can be responsible for managing clipboard copy/paste operations in the client 300 can communicate with a corresponding clipboard feature module 312 on the agent, which can be responsible for managing clipboard copy/paste operations in the agent 310. The clipboard features 302, 312 can communicate over a virtual channel 330 to exchange requisite data and commands for carrying out copy and paste operations between the client 300 and agent 310 to perform clipboard redirection.

Similarly, printer feature modules 304, 314 on the client 300 and agent 310, respectively, can correspond and exchange data over a virtual channel 330 to enable printing features (e.g., to allow the user to print a document from the remote desktop on the client device) in printer redirection. MMR feature modules 306, 316 on the client 300 and agent 310, respectively, can correspond and exchange data over a virtual channel 330 to enable multimedia redirection between the client 300 and agent 310. USB feature modules 308, 318 on the client 300 and agent 310, respectively, can correspond and exchange data over a virtual channel 330 to enable USB redirection between the client 300 and agent 310 (e.g., to allow the user to access from the remote desktop a USB device connected to the client device). While only these four features are illustrated in this example, various other features can also be supported by such a communication mechanism between client and agent and are not illustrated in the example of FIG. 2 for the sake of being concise.

Figure 4:
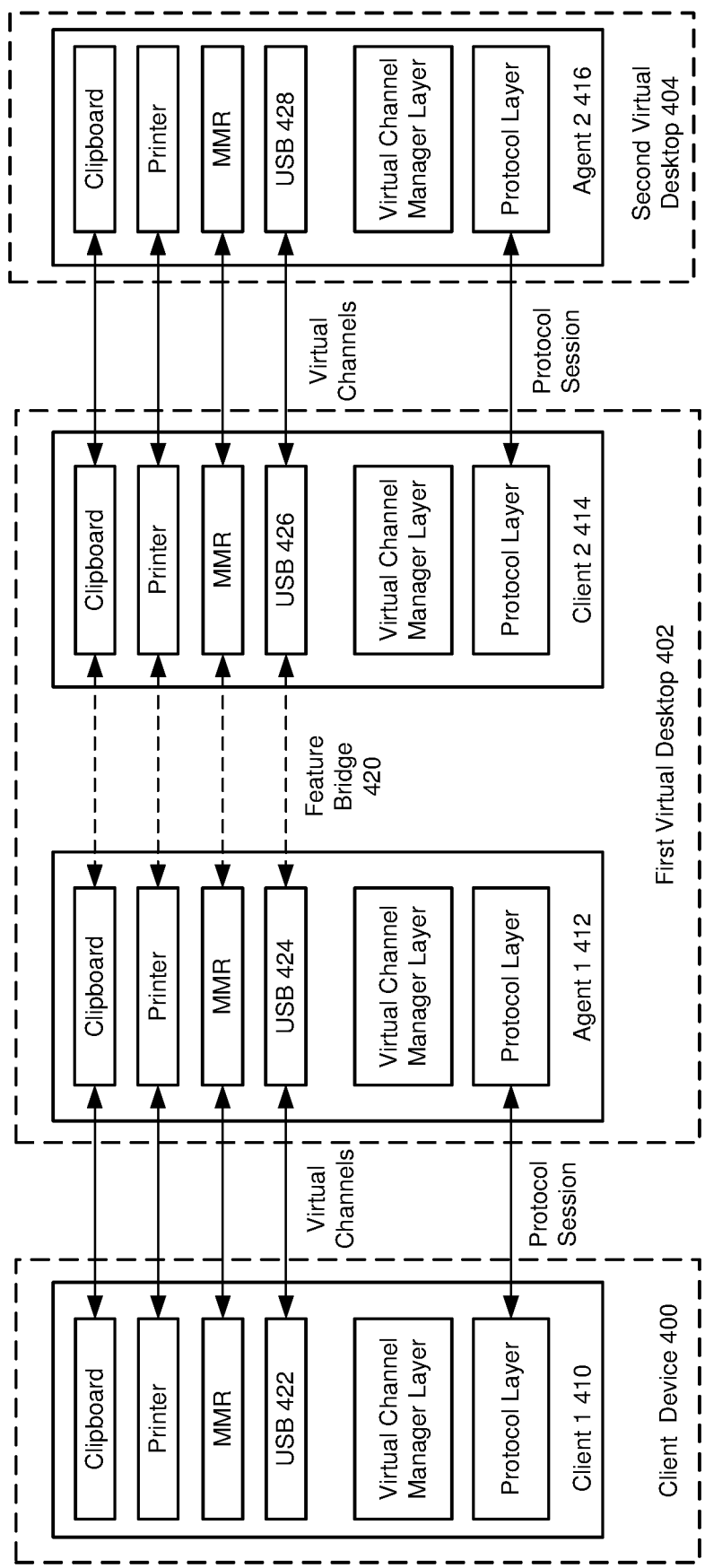
FIG. 4 illustrates an example of connections between feature modules in a virtual desktop environment in nested mode, in accordance with various embodiments.

FIG. 4 illustrates an example of connections between feature modules in a virtual desktop environment in nested mode, in accordance with various embodiments. As illustrated in the example of FIG. 4, in a nested mode configuration, client 1 410 on a client device 400 can connect to agent 1 412 on a first virtual desktop 402 in a first desktop session. Client 2 414 on the first virtual desktop 402 can connect to agent 2 416 on a second virtual desktop 404 in a second virtual desktop session. As described above in the example of FIG. 3, a protocol session can be established between each client 410, 414 and agent 412, 416, respectively, and various feature modules, such as remote experience features (e.g., clipboard, printer, MMR, and USB) on the clients 410, 414 can communicate with corresponding feature modules on the agents 412, 416 via virtual channels to enable the corresponding features in the virtual desktops 402, 404.

In various embodiments, feature redirection on the first desktop 402 can be performed over connections, such as the illustrated virtual channels, between feature modules on client 1 410 and corresponding feature modules on agent 1 412. Taking USB device redirection, for example. To access a USB device that is attached to the client device 400 in the first virtual desktop 402, the corresponding USB device data can be exchanged between the client device 400 and the first virtual desktop 402 (e.g., via agent 1 412). For example, a standard protocol session can provide for a virtual channel connection between client 1 410 in the client device 400 and agent 1 412 in the first virtual desktop 402 over which data can be exchanged for enabling the USB redirection.

As illustrated in the example of FIG. 4, several virtual channels between feature modules on client 2 414 and corresponding feature modules on agent 2 416 can also be established, which can also be protocol virtual channels. However, because these virtual channels connect client 2 414 to agent 2 416, they would not be sufficient by themselves for performing feature redirection between client 1 410 on the client device 400 and the second desktop 404. Taking USB device redirection, for example, to access a USB device that is attached to the client device 400 in the second virtual desktop 404, the corresponding USB device data needs to be exchanged between the client device 400 and the second virtual desktop 404 (e.g., via agent 2 416).

In various embodiments, to enable feature redirection between the second desktop 404 and client 1 410, connections can be established between client 1 410 and agent 2 416 and data can be exchanged over such connections to perform feature redirection between client 1 410 and agent 2 416. For example, the clipboard, printer, MMR, and USB features in client 1 410 can be connected with the clipboard, printer, MMR, and USB features in agent 2 416, respectively, so that data needed to redirect these features between client 1 410 and agent 2 416 can be exchanged over the corresponding connections.

Different approach can be utilized for connecting client 1 410 and agent 2 416 for enabling feature redirection between client 1 410 and the second desktop 404. For example, a communications channel (e.g., a virtual channel) can be established between client 1 410 and agent 2 416 for carrying the data.

However, while some remote desktop protocols may provide for protocol virtual channels for enabling the feature redirection connections between client 1 410 and agent 1 412, and between client 2 414 and agent 2 416 in the corresponding virtual desktop sessions on the first desktop 402 and the second desktop 404, such protocols might not provide for connections needed for feature redirection in nested mode, such as for redirecting feature data between client 1 410 and agent 2 416. For example, because client 1 410 might not have an established virtual desktop session directly on the second virtual desktop 404, various virtual desktop protocols may not provide virtual channels such as the ones between clients 410, 414 and agents 412, 416 for connecting client 1 410 and agent 2 416. In various embodiments, existing virtual channels between clients 410, 414 and agents 412, 416 can be used in conjunction with a feature bridge 420 formed in the first virtual desktop to create a connection or channel between client 1 410 and agent 2 416.

Such a feature bridge 420 can utilize any applicable mechanism or communication link to provide a way for data to be exchanged between agent 1 412 and client 2 414 and connect corresponding feature modules, as illustrated in the example of FIG. 4 by the dashed arrows. With this approach, in the case of USB redirection for example, data from a USB device that is connected to the client device 400 can first be transmitted over a virtual channel to agent 1 412 in the first desktop 402 (e.g., from USB module 422 in the client device 400 to USB module 424 in the first desktop 402). Then, in the first desktop 402, the USB data can be transmitted by the feature bridge 420 from agent 1 412 to client 2 414 (e.g., from USB module 424 to USB module 426 in the first desktop 402). Last, the USB data can be transmitted over a virtual channel from client 2 414 in the first desktop 402 to agent 2 416 in the second desktop 404 (e.g., from USB module 426 in the first desktop 402 to USB module 428 in the second desktop 404). Data from the second desktop 404 can likewise travel in the reverse order to the USB device on the client device 400.

The feature underlayer 420 can likewise be used by other features including remote experience features (e.g., clipboard, printer, MMR, etc.) in the second desktop in a similar way. Namely, the virtual channels can be used to exchange data for the features between client 1 410 and agent 1 412 of the first virtual desktop 402, and between client 2 414 and agent 2 416 of the second virtual desktop 404, while the feature bridge 420 can be used to exchange data between agent 1 412 and client 2 414 on the first virtual desktop 402. Different approaches can be used to implement the feature bridge and, while the invention is not limited to any particular approach, some approaches will be discussed in further detail further below.

Figure 5:
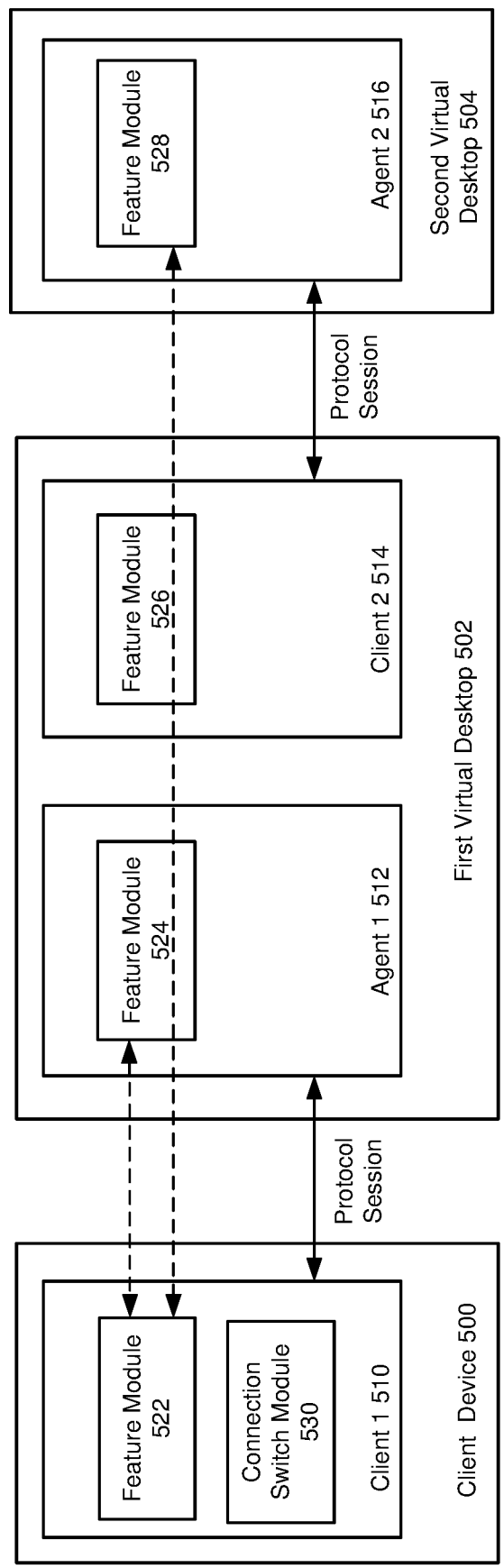
FIG. 5 illustrates an example architecture of a system for dynamic connection switching in virtual desktops under nested mode, in accordance with various embodiments.

FIG. 5 illustrates an example architecture of a system for dynamic connection switching in virtual desktops under nested mode, in accordance with various embodiments. As illustrated in the example of FIG. 5, in a nested mode configuration, client 1 510 on a client device 500 can connect to agent 1 512 on a first virtual desktop 502 in a first desktop session. Client 2 514 on the first virtual desktop 502 can connect to agent 2 516 on a second virtual desktop 504 in a second virtual desktop session. As described above, a protocol session can be established between each client 510, 514 and agent 512, 516 respectively. Feature modules 522, 524, 526, 528 can be contained in client 1 510, agent 1 512, client 2 514, and agent 2 516, respectively, for exchanging data for redirecting a corresponding feature to the first and second desktops 502, 504. For example, the feature may be any of a clipboard, printer, MMR, USB, etc., as described above and the modules 522, 524, 526, 528 can operate to exchange corresponding information and redirect the feature to the desktops 502, 504.

Accordingly, to redirect the feature to the first desktop 502, the client 1 feature module 522 can be connected to the agent 1 feature module 524 and corresponding data can be exchanged over the connection, which can be a virtual channel, to perform feature redirection. To redirect the feature to the second desktop 504, the client 1 feature module 522 can be connected to the agent 2 feature module 528 and data can be exchanged over this connection to perform feature redirection. As described above, the connection between the client 1 feature module 522 and the agent 2 feature module 528 can utilize the virtual channel between client 1 510 and agent 1 512, the virtual channel between client 2 514 and agent 2 516, and a bridge connection between agent 1 512 and client 2 514 connecting the virtual channels.

In various embodiments, feature redirection can be dynamically switched to either desktop while the desktops 502, 504 are running utilizing a connection switching mechanism. The mechanism can connect the client 1 feature module 522 to either the agent 1 feature module 524 or the agent 2 feature module 528 for redirecting the feature to the corresponding desktop 502, 504. When redirection to a desktop 502, 504 is stopped, the corresponding connection to the feature module in that desktop can be terminated. This way, redirection can take place on either desktop and the mechanism can change which desktop the feature is redirected to dynamically during operation of the desktops.

For example, initially (e.g., when the user logs into the first desktop 502), a connection can be established between the client 1 feature module 522 and the agent 1 feature module 524 in the first desktop 502 for exchanging feature redirection data for the feature. The feature can then be redirected to the first desktop 502 by exchanging corresponding data over the connection. After nested mode is established with the second desktop 504, a request can be received to switch the feature redirection to the second desktop 504. For example, the request can be initiated by the user providing an input indicating that the feature (e.g., USB, printer, microphone, etc.) is to be redirected to the second virtual desktop 504. In response to the request, the client 1 feature module 522 can establish a connection for the feature redirection with the agent 2 feature module 528 in the second desktop 504 and the feature can be subsequently redirected to the second desktop 504 by exchanging corresponding data over the new connection. During the switch, the previous client 1 feature module 522 to agent 1 feature module 524 connection can be terminated.

Subsequently, if a request is received to switch redirection back to the first desktop 502, the feature redirection connection can be switched back to the feature module 524 in first desktop 502 and the feature can return to being redirected to the first desktop 502. In this way, features can be redirected to either desktop and be switched dynamically between the desktops during operation of the desktops.

As mentioned in the above example, the request to switch redirection from one desktop to the other can be initiated by the user. For example, the user may be presented with a menu, prompt, or other element in the user interface of client 1 510 allowing the user to select which desktop (e.g., 502, 504) a particular feature is to be redirected to. The user's input can be received by a connection switch module 530 in client 1 510, which can carry out the request. For example, to connect/disconnect feature module 524 to/from the client 1 feature module 522, the connection switch module 530 can send a request to agent 1 512 and/or client 1 510 to perform the connect/disconnect task. Similarly, to connect/disconnect feature module 528 to/from the client 1 feature module 522, the connection switch module 530 can send a request to agent 2 516 and/or client 1 510 to perform the connect/disconnect task. In various embodiments, a request to switch feature redirection may be generated in other ways instead of by the user; for example, the request may be generated automatically or by a process running on either desktop 502, 504 or in the client device 500.

Figure 6:
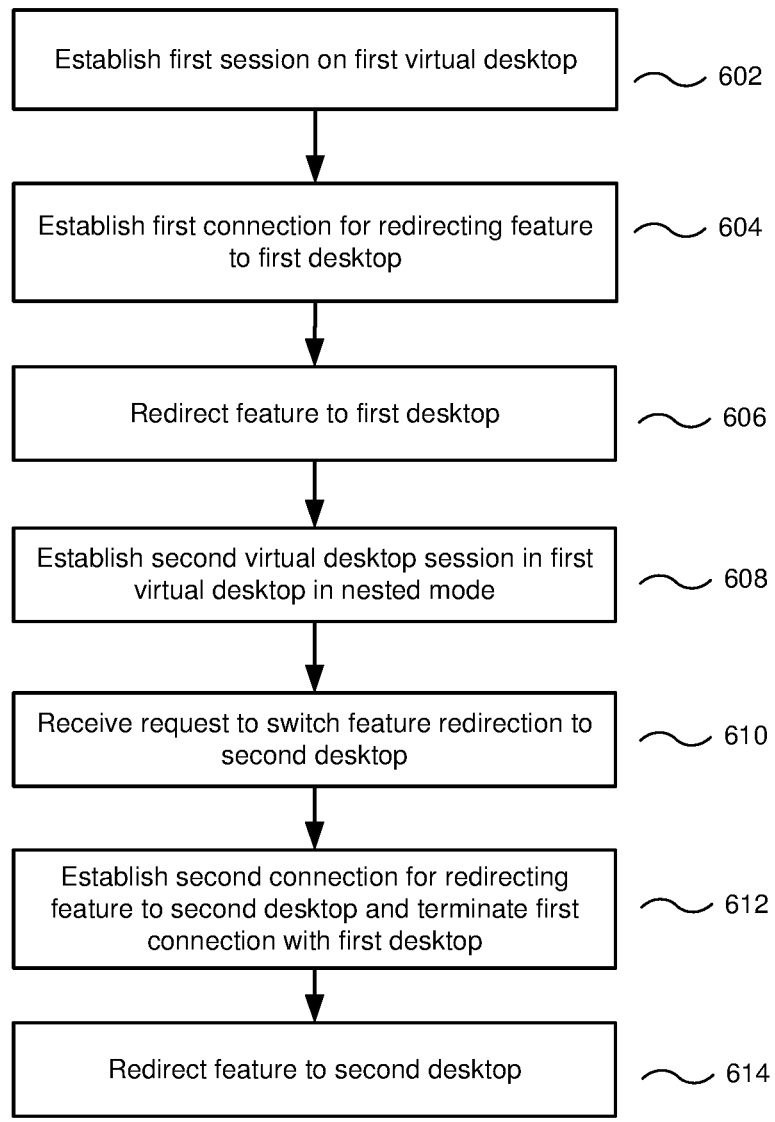
FIG. 6 illustrates an example process flow for dynamic connection switching in virtual desktops under nested mode, in accordance with various embodiments.

FIG. 6 illustrates an example process flow for dynamic connection switching in virtual desktops under nested mode, in accordance with various embodiments. The process can begin in operation 602, where a first virtual desktop session can be established on a first virtual desktop. For example, the session can be established by a user logging into the first virtual desktop via a first client running on the user's client device. The first client can connect to a first agent in the first desktop to establish the session. In operation 604, a first connection can be formed for redirecting a feature to the first virtual desktop. For example, the connection can be a virtual channel established for redirecting a feature such as a USB device attached to the client device to the first virtual desktop. The connection can be formed between a feature module in the first client and a feature module in the first agent. In operation 606, the feature can be redirected to the first desktop by exchanging data over the connection. For example, USB device data can be exchanged between feature modules in the first client and the first agent to redirect the USB device to the first desktop.

In operation 608, a second virtual desktop session can be established in the first virtual desktop in nested mode. For example, the second session can be established by the user opening a second client inside the first virtual desktop and logging into the second virtual desktop with the second client. The second client can connect to a second agent in the second desktop to establish the second session.

After the session on the second desktop in nested mode is established, in operation 610, a request can be received to switch redirection of the feature to the second desktop. For example, the user may request (e.g., via a menu item in the first client UI) to redirect the USB device to the second desktop instead of the first desktop. In operation 612, in response to the request, a second connection can be established for redirecting the feature to the second desktop and the first connection for redirecting the feature to the first desktop that was formed in operation 604 can be terminated. The connection can be formed between the feature module in the first client and a feature module in the second agent. In various embodiments, this connection can use the protocol virtual channels between the client and agent of each desktop and a bridge between the agent of the first desktop and the client of the second desktop in the first desktop, as described previously. In operation 614, the feature can be redirected to the second desktop by exchanging data over the second connection. For example, USB device data can be exchanged between the first client and the second agent to redirect the USB device to the second desktop.

If a subsequent request (whether initiated by the user or otherwise) is received to switch the feature redirection back to the first desktop, redirection of the feature can be switched back to the first desktop by re-establishing the first connection and terminating the second connection. The same process can take place for redirection of various other features including but not limited to the ones described in other portions of this document.

In various embodiments, the invention can be implemented as a modification to existing virtual desktop products (e.g., on top of a standard virtual desktop client and agent), such as in the VMware Horizon infrastructure. For example, in the Horizon virtual desktop architecture, an agent-side remote experience feature process (e.g., a feature module) running in the agent communicates over a virtual channel with a client-side remote experience feature process running in the client to coordinate redirection of a feature and to exchange corresponding feature redirection data. The remote experience feature process receives a notification, initiated by the protocol layer (e.g., the Blast protocol in the Horizon architecture), to connect or disconnect the virtual channel between the client-side remote experience feature process and the agent-side remote experience feature process. When the VDI session is established, the connection event of the virtual channel is triggered. When the VDI session is disconnected, the disconnection event of the virtual channel is triggered. Hence, in the Horizon architecture, the connection and disconnection of the virtual channel for redirecting the feature is determined by the connection and disconnection of the VDI session.

In various embodiments, to remove the VDI session's control over the connection and disconnection of the virtual channel used by feature redirection, a filter can be placed on the interface of the remote experience feature process, which can be used to control when connect and disconnect events of the virtual channel are triggered in the remote experience feature process. For example, the filter can be used to send connect and disconnect commands to the remote experience feature process. As a result, the filter can be used to connect or disconnect a feature's connection dynamically, independently of the connection or disconnection of the VDI session.

In various embodiments, such a filter can be placed or activated in response to the nested mode being used. For example, when an agent or client is not operating as part of a nested configuration, the filter may be unnecessary and the standard connection/disconnection events of the virtual channel can be permitted during non-nested mode operation. Once a nested mode is utilized, however, the connect/disconnect events of the remote experience features may be controlled differently to enable dynamic feature redirection switching, as described herein. Accordingly, when nested mode is used, the filter can be implemented. In various embodiments, the filter can be implemented in response to the nested mode being detected, e.g., when a second virtual desktop session is launched within a first virtual desktop session. For example, the filter can be a dll (dynamic link library) file that is loaded by a corresponding feature redirection module or remote experience feature process when nested mode is used. In various embodiments, the filter can be a filter driver that intercepts requests or messages made to the remote experience feature process.

FIG. 7A illustrates an example of a system for dynamic connection switching in virtual desktops under nested mode implementing a filter, in accordance with various embodiments. As illustrated in the example of FIG. 7A, in a nested mode configuration, client 1 710 on a client device 700 can connect to agent 1 712 on a first virtual desktop 702 in a first desktop session. Client 2 714 on the first virtual desktop 702 can connect to agent 2 716 on a second virtual desktop 704 in a second virtual desktop session. As described above, a protocol session can be established between each client 710, 714 and agent 712, 7516 respectively.

USB redirection modules 722, 724, 726, 728 can operate in client 1 710, agent 1 712, client 2 714, and agent 2 716, respectively, for exchanging data for redirecting a USB device attached to the client device 700 to the first and second desktops 702, 704. While the examples of FIGS. 7A and 7B illustrate USB redirection, it should be understood that other features could be redirected in the same way as describe in these examples. For example, instead of USB, the redirected feature 722, 724, 726, 728 may be any of a clipboard, printer, RTAV, MMR, etc., as described above.

As illustrated, agent 1 712 can contain filter 1 732, which can control connection and disconnection events of the USB redirection module 724 with the USB redirection module 722 in client 1 710. For example, filter 1 732 can be a filter placed on the interface of the USB redirection module 724, which can control the sending of connect and disconnect requests or commands that are conveyed to the USB redirection module 724.

Similarly, agent 2 716 can contain filter 2 734, which can control connection and disconnection events of the USB redirection module 728 with the USB redirection module 722 in client 1 710. For example, filter 2 734 can be a filter placed on the interface of the USB redirection module 728, which can control the sending of connect and disconnect requests or commands that are conveyed to the USB redirection module 728.

In various embodiments, each filter 732, 734 can be a dll (dynamic link library) file that is loaded by the corresponding USB module 724, 728.

As illustrated in the example of FIG. 7A, the client 1 USB redirection module 722 is connected to the agent 1 USB redirection module 732, which can be a protocol virtual channel connection. Accordingly, a USB device connected to the client 700 can be redirected the first virtual desktop 702 over this connection.

FIG. 7B illustrates an example of a system for dynamic connection switching in virtual desktops under nested mode implementing a filter to redirect a USB device to the second virtual desktop, in accordance with various embodiments. When the USB device is being redirected to the first virtual desktop 702, as in the example of FIG. 7A, a request may be received to switch redirection of the USB device to the second desktop 704. For example, the user may produce an input on client 1 710 to perform the switch. For example, the request may be received by a connection switch module in the client responsible for switching connections of feature redirection modules such as USB redirection modules 722, 724, 726, 728. In response to the request, the agent 1 USB redirection module 724 can be disconnected from the client 1 USB redirection module 722. For example, filter 1 732 can trigger a channel disconnect even on the agent 1 USB redirection module 724, which can be performed in response to a request/message received by filter 1 732 (e.g., from the connection switch module). Then, as illustrated in the example of FIG. 7B, the agent 2 USB redirection module 728 can establish a connection with the client 1 USB redirection module 722. For example, filter 2 734 can trigger a connect event on the agent 2 USB redirection module 728, which can be performed in response to a message/request received by filter 2 734 (e.g., from the connection switch module). The connection between client 1 USB redirection module 722 and agent 2 USB redirection module 728 can utilize virtual channels that are bridged in the first desktop 702, as described previously.

If a request is subsequently received to redirect the USB device back to the first desktop 702 (e.g., the request may be initiated by the user), the connection between the agent 2 USB redirection module 728 and the client 1 USB redirection module 722 can be disconnected (e.g., filter 2 734 can trigger a disconnect event on agent 2 USB Redirection module 728), and the agent 1 USB redirection module 724 can be reconnected with client 1 USB redirection module 722 again (e.g., filter 1 732 can trigger a channel connect even on the agent 1 USB redirection module 724). During this channel switching, as illustrated in FIGS. 7A and 7B, both virtual desktop sessions 702, 704 can remain connected.

Returning to the example of FIG. 4, various approaches can be utilized for implementing the feature bridge in the first virtual desktop. In various embodiments, the feature bridge 420 can operate by passing the data through a feature "underlayer", by pushing the data up to the driver layer and back from the protocol layer. For example, to pass data from agent 1 412 to client 2 414, the data can be pushed up to the driver layer in agent 1 412, be passed to client 2 414 at the driver layer, and then be pushed back down from the driver layer on client 2 414 to the protocol or virtual channel layer to be transmitted to agent 2 416.

However, the approach utilizing the feature underlayer has significant drawbacks. For example, to pass data at the driver level using a feature underlayer for the bridge 420, the data is first received at the protocol layer of agent 2 414 (e.g., the data can be received from client 1 410 over a virtual channel) and is then be passed through multiple layers of agent 2 414 before reaching the lowest system driver. Then, the data can be transferred from the lowest system driver to client 2 414 and passed to the upper layer through multiple layers before reaching the protocol layer of client 2 414, from where the data can be passed over the virtual channel to agent 2 416. A reverse path can likewise be used for flow of data in the opposite direction. However, passing the data up and down through the multiple layers can incur significant performance penalties.

Figure 8:
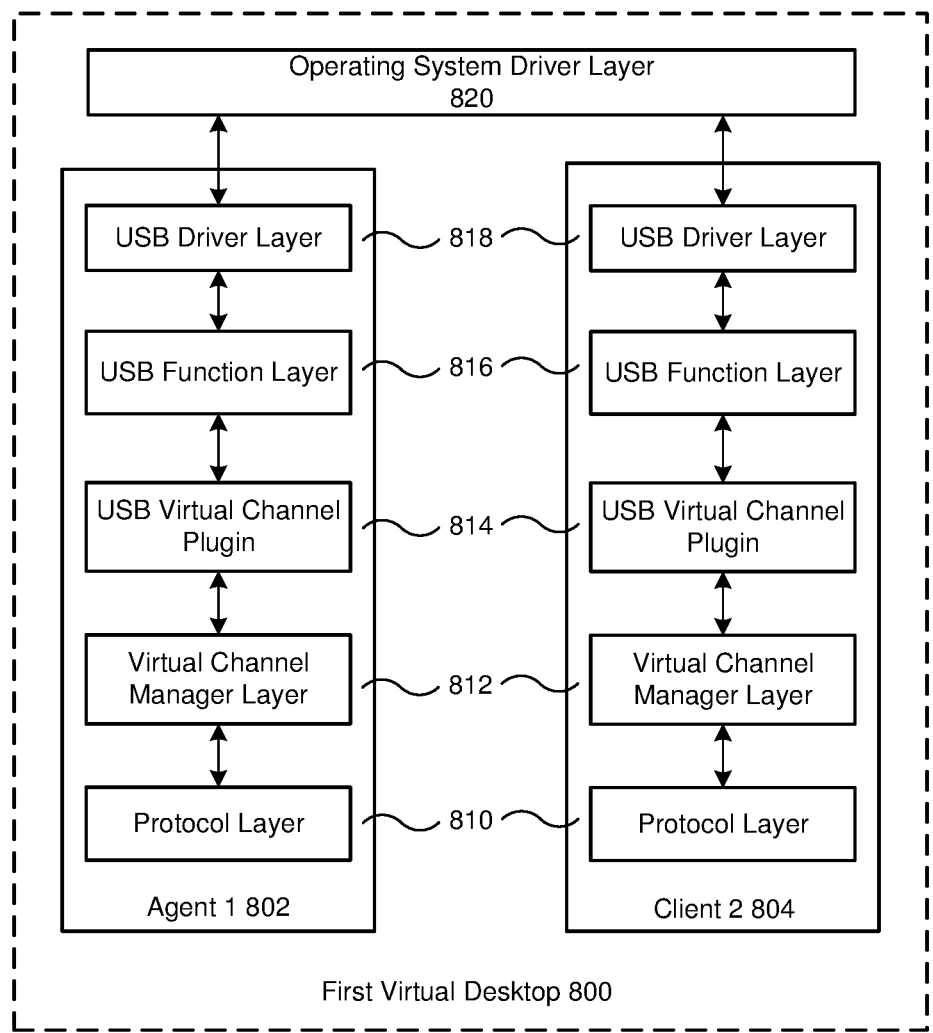
FIG. 8 illustrates an example of data exchange via a feature underlayer in USB redirection under nested mode, in accordance with various embodiments.

FIG. 8 illustrates an example of data exchange via a feature underlayer in USB redirection under nested mode, in accordance with various embodiments. As illustrated in the example of FIG. 8, agent 1 802 and client 2 804 can operate in a first virtual desktop 800. The first desktop 800 can be a first virtual desktop in a nested mode configuration, such as in the example of FIG. 4, where another client running on a client device is connected with agent 1 802 to establish a session on the first desktop 800, and client 2 804 is connected to another agent running in a second virtual desktop to establish a second virtual desktop session on the second desktop.

To perform USB redirection using the illustrated feature underlayer when a user is using the nested mode, for example, USB data can first be received at the protocol layer 810 of agent 1 802. For example, the data can be conveyed from a client running on the user client device via a virtual channel. In agent 1 802, the data can then be passed to the virtual channel manager layer 812, which can be responsible for receiving, sending, and managing data received/sent over the protocol channels. Then, the USB data can be pushed through multiple layers, such as the USB virtual channel plugin layer 814, USB function layer 816, and USB driver layer 818 before reaching the operating system driver layer 820, which may for example be a Windows (available from Microsoft Corp.) operating system driver layer.

At the OS driver layer 820, the USB data can be conveyed to client 2 804 and travel through the same series of layer to reach the virtual channel manager layer 812 on client 2 804. From the virtual channel manager layer 812, the USB data can then be conveyed over the protocol layer 810 from client 2 804 to an agent operating in the second virtual desktop. USB data traveling in the opposite direction, from the second virtual desktop to the client device, can similarly follow this path through the multiple layers in the opposite direction.

Other features, such as different remote experience features, used in nested mode can likewise utilize the feature underlayer as illustrated in the example of FIG. 8 to exchange data during nested mode. As illustrated in this example, when using the feature underlayer data must traverse multiple layers to be exchanged between agent 1 802 and client 2 804 at the driver layer. Further, the data may need to be decoded and encoded when it is transferred by the feature underlayer so that it can be handled by the different layers and components. All of this can create limitations and have significant negative impacts on performance of the virtual desktop.

Returning back to the example of FIG. 4, in various embodiments different mechanisms can be utilized that pass the data between feature modules in agent 1 412 and client 2 414 in ways that are more efficient than using the feature underlayer as described above. For example, the data can be passed by from agent 1 412 to client 2 414 directly without pushing it down to the driver level, such as by sending messages or communicating via other channels.

In various embodiments, the feature bridge can be a "nested bridge" that can be established between the first virtual desktop agent and the second virtual desktop client, both running in the first virtual desktop, for communicating data between the first virtual desktop agent and the second virtual desktop client. The nested bridge can utilize Inter-Process Communication (IPC) for fast and efficient transfer of data between the first virtual desktop agent and the second virtual desktop client. Consequently, the nested bridge can be utilized in conjunction with the virtual channels for exchanging data between the first client running on the client device and the second virtual desktop. For example, data can be conveyed from the first client on the client device to the first agent in the first virtual desktop over a virtual channel, passed from the first agent to the second client running in the first virtual desktop using the nested bridge, and then conveyed from the second client to the second agent in the second virtual desktop over a virtual channel. Data can likewise be communicated from the second virtual desktop agent to the first client over the virtual channels and the nested bridge in the opposite direction. As a result, a fast and efficient path for exchanging data between the first client on the client device and the second virtual desktop is provided, which can be utilized for enabling various features and capabilities in the second virtual desktop.

Figure 9:
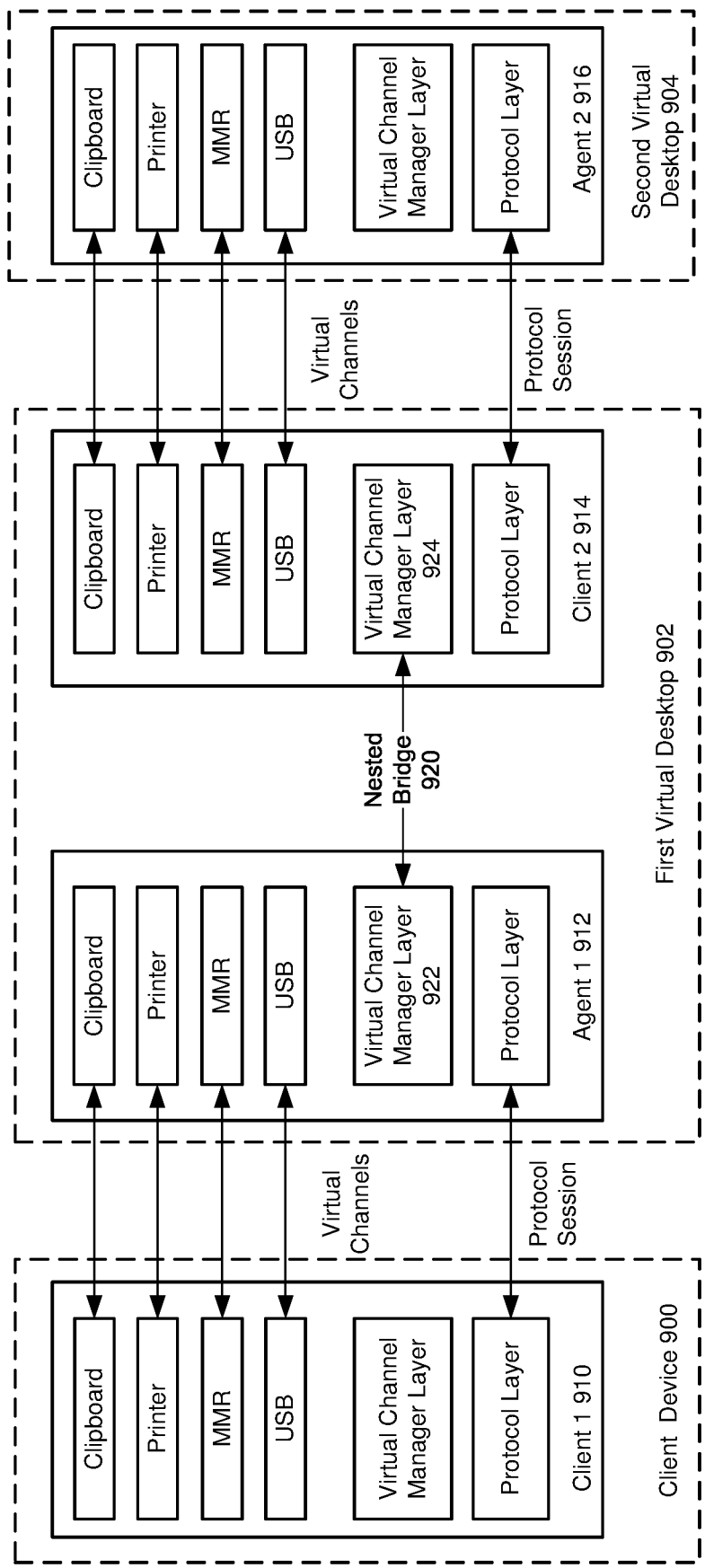
FIG. 9 illustrates an example of a nested bridge for data transfer in a virtual desktop environment under nested mode, in accordance with various embodiments.

FIG. 9 illustrates an example of a nested bridge for data transfer in a virtual desktop environment under nested mode, in accordance with various embodiments. As illustrated in the example of FIG. 9, in this nested mode configuration, client 1 910 on a client device 900 can connect to agent 1 912 on a first virtual desktop 902 in a first desktop session, and client 2 914 on the first virtual desktop 902 can connect to agent 2 916 on a second virtual desktop 904 in a second virtual desktop session. A protocol session can be established between each client 910, 914 and agent 912, 916, respectively, and various feature modules, such as remote experience features (e.g., clipboard, printer, MMR, and USB) on the clients 910, 914 can communicate with corresponding feature modules on the agents 912, 916 via corresponding virtual channels to enable the corresponding features in the virtual desktops 902, 904.

In various embodiments, to improve the performance of features requiring data exchange with the second desktop 904 in nested mode, such as the remote experience features, a nested bridge 920 can be established, which can facilitate and manage the exchange of data in the middle hop, between virtual desktop agent 1 912 and the virtual desktop client 2 914 running in the first virtual desktop 902. The nested bridge 920 can enable exchange of data between agent 1 912 and client 2 914 directly, without requiring the data to be pushed to the driver level. For example, the nested bridge 920 can route messages at the virtual channel level. This approach can also bypass feature-level encode and decode operations. As a result, feature performance can be improved significantly compared to other approaches, such as the exchange of data via the feature underlayer as discussed above.

In various embodiments, the nested bridge 920 can be used to exchange data at the virtual channel manager layer, as illustrated in the example of FIG. 9. For example, the virtual channel manager layer 922 in agent 1 912 can contain a virtual channel manager that operates to send and receive data in the session over protocol channels with client 1 910. The virtual manager can be responsible for receiving, sending, and managing the data exchanged with client 1 910 in the client device 900, which can include the sending, receiving, and managing of data such as remote experience feature data, user input data, screen data, or any other data exchanged in the remote desktop protocol. Similarly, the virtual channel manager layer 924 in client 2 924 can contain a virtual channel manager that operates to send and receive data in the protocol session, over the protocol channels with agent 2 916. This virtual channel manager can be responsible for receiving, sending, and managing the data exchanged with agent 2 916 in desktop 2 904, which can include the sending, receiving, and managing of data such as remote experience feature data, user input data, screen data, or any other data exchanged in the remote desktop protocol. In various embodiments, the nested bridge 920 can serve as a mechanism of communication between these virtual channel managers. In other embodiments, the nested bridge 920 can serve as a mechanism of communication between agent 1 912 and client 2 914 at different levels and between different components and processes. For example, benefits to efficiency may be realized by exchanging data at different levels before reaching the driver level.

In various embodiments, the nested bridge 920 can be utilized in conjunction with other channels, e.g., protocol channels or virtual channels, for exchanging data or messages between client 1 910 running on the client device 900 and agent 2 916 running in the second virtual desktop 904. The data or messages exchanged may be any kind of data or messages being transmitted between client 1 910 and agent 2 916, such as data or messages for any remote experience features, user input data, display data, or any other data. For example, the data can be conveyed from client 1 910 on the client device 900 to agent 1 912 in the first virtual desktop 902, which may be performed over a protocol connection such as a virtual channel. Then, the data can be passed from agent 1 912 to client 2 914 in the first virtual desktop 902 using the nested bridge 920. From client 2 914, the data can then be conveyed to agent 2 916 in the second virtual desktop 904, which may also be performed over a protocol connection such as a virtual channel. Data can likewise be communicated from the virtual desktop agent 2 916 to client 1 910 in the reverse direction, in reverse order. For example, data can be conveyed over a virtual channel from agent 2 916 to client 2 914, over the nested bridge 920 from client 2 914 to agent 1 912, and over a virtual channel from agent 1 912 to client 1 910. As a result, a fast and efficient path for exchanging data between client 1 910 on the client device 900 and the second virtual desktop 904 is provided, which can be utilized for enabling and improving various features and capabilities in the second virtual desktop.

In various embodiments, the nested bridge 920 can utilize an Inter-Process Communication (IPC) mechanism for communicating data between agent 1 912 and client 2 914, or between processes or threads running in agent 1 912 and client 2 914. In some embodiments, with IPC, a process running in client 2 914 can communicate with a process running in agent 1 912 using a buffer, which can be a common space or memory location for the processes. The processes can communicate by reading data from and writing data to the shared memory area. When one process needs to communicate data to the other, the sending process can write the data in the buffer and the receiving process can read the data from the buffer. In other embodiments, IPC can operate by message-passing, without necessarily using shared memory space. In this case, the sending process can pass a message, which can be accompanied by various address information of the receiving process such as a passing name or a mailbox name, and the messages can be conveyed to or retrieved by the receiving process.

Figure 10:
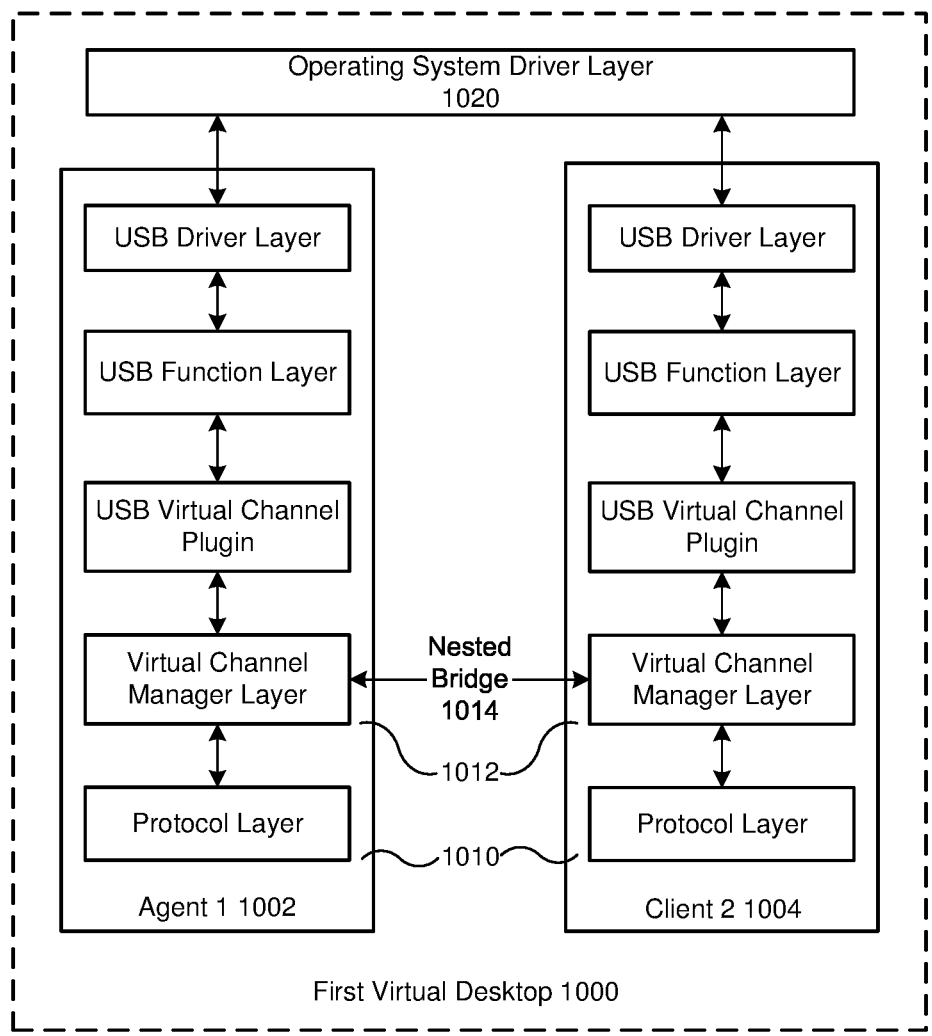
FIG. 10 illustrates an example of data exchange via a nested bridge in USB redirection under nested mode, in accordance with various embodiments.

FIG. 10 illustrates an example of data exchange via a nested bridge in USB redirection under nested mode, in accordance with various embodiments. As illustrated in the example of FIG. 10, agent 1 1002 and client 2 1004 can operate in a first virtual desktop 1000. The first desktop 1000 can be a first virtual desktop in a nested mode configuration, where another client running on a client device is connected with agent 1 1002 to establish a session on the first desktop 1000, and client 2 1004 is connected to another agent running in a second virtual desktop to establish a second virtual desktop session on the second desktop.

To perform USB redirection using the illustrated nested bridge 1014 when a user is using the nested mode, USB data can first be received at the protocol layer 1010 of agent 1 1002. For example, the data can be conveyed from a client running on the user client device via a virtual channel. In agent 1 1002, the data can be received by a virtual channel manager in a virtual channel manager layer 1012 from the protocol layer 1010, which can be responsible for receiving, sending, and managing data received/sent over the protocol channels. Then, at the virtual channel manager layer 1012, the data can be passed to client 2 1004 (e.g., to a virtual channel manager in client 2 1004). From the virtual channel manager layer 1012 on client 2 1004, the USB data can then be conveyed over the protocol layer 510 from client 2 504 to an agent operating in the second virtual desktop. USB data traveling in the opposite direction, from the second virtual desktop to the client device, can similarly follow this path in the opposite direction.

Other features, such as different remote experience features, used in nested mode can likewise utilize the nested bridge 1014 as illustrated in the example of FIG. 10 to exchange data during nested mode.

As can be seen in the example of FIG. 10, the nested bridge 1014 provides a significantly more efficient way of data exchange than the feature underlayer discussed in the example of FIG. 5, which required the transfer of data back and forth through multiple layers to transfer data at the driver layer 1020. This approach can also avoid the need to decode and encode data when it is transferred by the feature underlayer so that it can be handled by the different layers and components. As a result, the nested bridge 1014 can eliminate limitations and significantly improve performance of features in nested mode.

Figure 11:
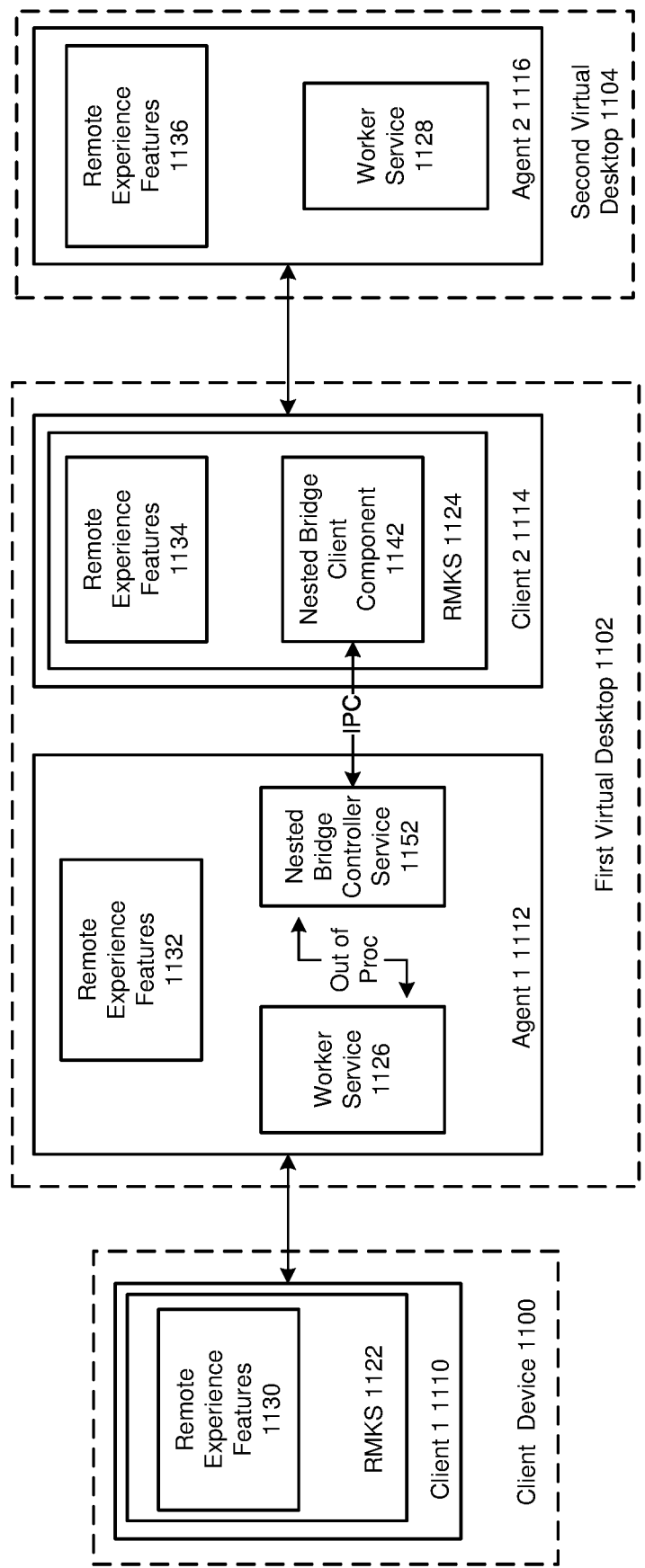
FIG. 11 illustrates an example architecture of a nested bridge for data transfer in a virtual desktop environment under nested mode, in accordance with various embodiments.

FIG. 11 illustrates an example architecture of a nested bridge for data transfer in a virtual desktop environment under nested mode, in accordance with various embodiments. As illustrated in the example of FIG. 11, in this nested mode configuration, client 1 1110 on a client device 1100 can connect to agent 1 1112 on a first virtual desktop 1102 to establish a first desktop session, and client 2 1114 on the first virtual desktop 1102 can connect to agent 2 1116 on a second virtual desktop 1104 to establish a second virtual desktop session. A protocol session can be established between each corresponding client 1110, 1114 and agent 1112, 1116 and various feature modules, such as remote experience features 1130, 1134 (e.g., clipboard, printer, MMR, RTAV, USB, etc.) on each client 1110, 1114 can communicate with corresponding feature modules 1132, 1136 on the agents 1112, 1116 via virtual channels to enable the corresponding features in the virtual desktops 1102, 1104.

A remote mouse-keyboard-screen (RMKS) module 1122 can run in client 1 1110, which can be responsible for managing the exchange of various information with agent 1 1112 during the session on the virtual desktop 1102, such as information for enabling user interaction with the desktop 1102. For example, the RMKS module 1122 can send user inputs (mouse and keyboard inputs) to agent 1 1112 and receive screen (GUI) information such as pixel data from agent 1 1112. Various remote experience feature modules 1130 (e.g., MMR, printer, RTAV, clipboard, USB, etc.) can be contained in the RMKS module 1122 and the RMKS process can likewise manage the sending and receiving of data for enabling these features in the desktop 1102. An RMKS module 1124 can also be located in client 2 1114 and similarly manage the exchange of information with agent 2 1116 in the second virtual desktop 1104, including the exchange of information for various remote experience features 1134, 1136 in the second desktop 1104.

In various embodiments, a worker service 1126 on the agent 1 1112 can be responsible for managing interactions with the desktop 1102 on the agent-side. For example, in an implementation using the VMware Blast protocol, the worker service 1126 may be a Blast Worker process. The worker service 1126 can be responsible for capturing GUI data (e.g., pixel data) on the desktop 1102 and sending it to the client 1 1110. The worker 1126 can also receive user inputs (e.g., from client 1 1110) and convey them to the operating system of the desktop 1102 to be effectuated. Data and messages corresponding to remote experience features 1132 sent by client 1 1110 can also be received by the worker service 1126 over a virtual channel. Similarly, a worker service 1128 can be running on the second desktop 1104 for performing analogous functions on the second desktop 1104, that is, the worker service 1128 can be responsible for capturing GUI data (e.g., pixel data) on the second desktop 1104 and sending it to client 2 1114. The worker 1128 can also receive inputs (e.g., from client 2 1114) and convey them to the operating system of the desktop 1104 to be effectuated. Data and messages corresponding to remote experience features 1136 sent by client 2 1114 can also be received by the worker service 1128 over a corresponding virtual channel.

In various embodiments, agent 1 1112 can further contain a nested bridge controller service 1152, which can act as the controller of the nested bridge. The nested bridge controller service 1152 can communicate with the worker service 1126 by sending and receiving out of proc (out of process) messages, as illustrated. Via the worker service 1126, the nested bridge controller service 1152 can further communicate with client 1 1110. For example, data and messages can be sent from client 1 1110 to the worker service 1126 over a virtual channel and then to the nested bridge controller service 1152 via an out of proc message. Similarly, the nested bridge controller service 1152 can send data and messages to client 1 1110 by sending the data or message to the worker service 1126 via an out of proc message and having the worker service 1126 forward the data or message to client 1 1110 over the virtual channel.

The nested bridge controller service 1152 can interact and communicate with a nested bridge client component 1142 in client 2 1114 through IPC. In various embodiments, the nested bridge client component 1142 can be a dll (a dynamic link library file or component) that runs in the RMKS module 1124. The nested bridge client component 1142 can take over (e.g., intercept) virtual channel connections between client 2 1114 and agent 2 1116 and then transfer data that is sent over the virtual channel to the nested bridge controller 1152 by IPC. Similarly, the nested bridge client component 1142 can receive data by IPC from the nested bridge controller 1152 and send the data over the virtual channel to agent 2 1116.

Thus, the nested bridge controller service 1152 and the nested bridge client component 1142 can connect virtual channels between client 1 1110 and agent 1 1112 with virtual channels between client 2 1114 and agent 2 1116 so that data, such as remote experience feature data, can be transmitted from client 1 1110 to agent 2 1116. For example, to send data, such as remote experience feature data (e.g., USB redirection) from client 1 1110 to agent 2 1116, the data can be first conveyed over a virtual channel from client 1 1110 to the worker service 1126 in agent 1 1112. By the worker service 1126, the data can be conveyed (e.g., via an out of proc message) to the nested bridge controller service 1152. The controller service 1152 can convey the data via IPC to the nested bridge client component 1142 in client 2 1114, which can subsequently convey the data over a virtual channel to agent 2 1116. To send data (e.g., remote experience feature data) in the opposite direction, from agent 2 1116 to client 1 1110, the nested bridge client component 1142 can receive or intercept the data that is sent over the virtual channel from agent 2 1116 to client 2 1114 and convey the data to the nested bridge controller 1152 by IPC. The controller service 1152 can then convey the data via an out of proc message (as illustrated) to the worker service 1126, which can subsequently convey the data to client 1 1110 over the virtual channel. In this way, data for enabling other types of features can likewise be efficiently exchanged between client 1 1110 and agent 2 1116.

Figure 12:
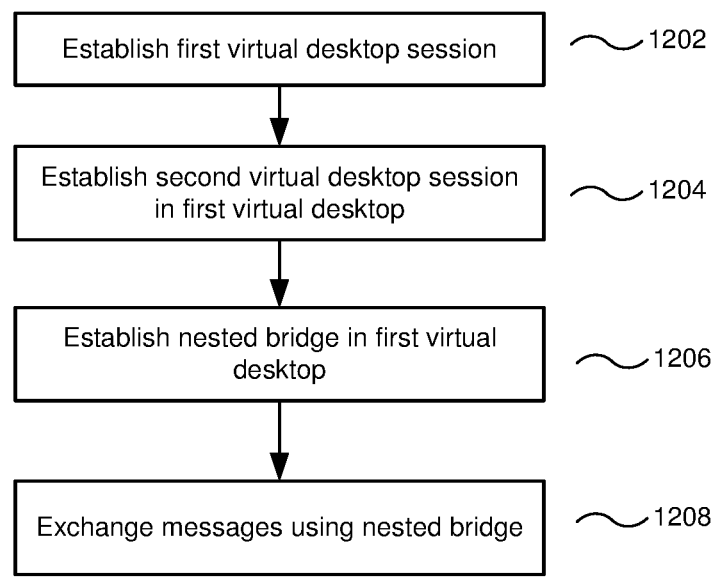
FIG. 12 illustrates an example process flow for data transfer using a nested bridge in a virtual desktop environment under nested mode, in accordance with various embodiments.

FIG. 12 illustrates an example process flow for data transfer using a nested bridge in a virtual desktop environment under nested mode, in accordance with various embodiments. The process can begin in operation 1202, where a first virtual desktop session can be established. For example, the session can be established by a user logging into the first virtual desktop via a first client running on the user's client device. The first client can connect to a first agent in the first desktop to establish the session and one or more virtual channels can be formed for communicating data between the first client and the first agent. In operation 1204, a second virtual desktop session can be established in the first virtual desktop. For example, the second session can be established by the user opening a second client inside the first virtual desktop and logging into the second virtual desktop with the second client. The second client can connect to a second agent in the second desktop to establish the second session and one or more virtual channels can be formed for communicating data between the second client and the second agent.

In operation 1206, a nested bridge can be established in the first virtual desktop. As described above, the nested bridge can connect the agent of the first desktop with the client of the second desktop to provide an efficient mechanism of communication between the first agent and the second client operating in the first desktop. The nested bridge can utilize IPC to allow a process in the first agent to communicate with a process in the first client. Consequently, in operation 1208, messages can be exchanged between the first agent and the second client in the first desktop over the nested bridge.

For example, data to be communicated from the first client on the client device to the second agent in the second desktop can be conveyed using the nested bridge. In this case, for example, data or message can be sent over a virtual channel from the first client to the first agent in the first desktop, and then over the nested bridge from the first agent in the first desktop to the second client, also in the first desktop. Finally, the data or message can be sent from the second client in the first desktop to the second agent in the second desktop over a corresponding virtual channel. Data and messages can likewise be communicated in the opposite direction, from the second agent to the first client, over this path in reverse order.

In various embodiments, messages can be exchanged between the first client and the second agent for utilizing one or more remote experience features in the second virtual desktop, such as USB redirection, clipboard redirection, printer redirection, MMR, etc. For example, printer data, USB data, multimedia data and so on can be exchanged between the first client and the second agent using the nested bridge in conjunction with virtual channels between the clients and agents as described above.

Figure 13:
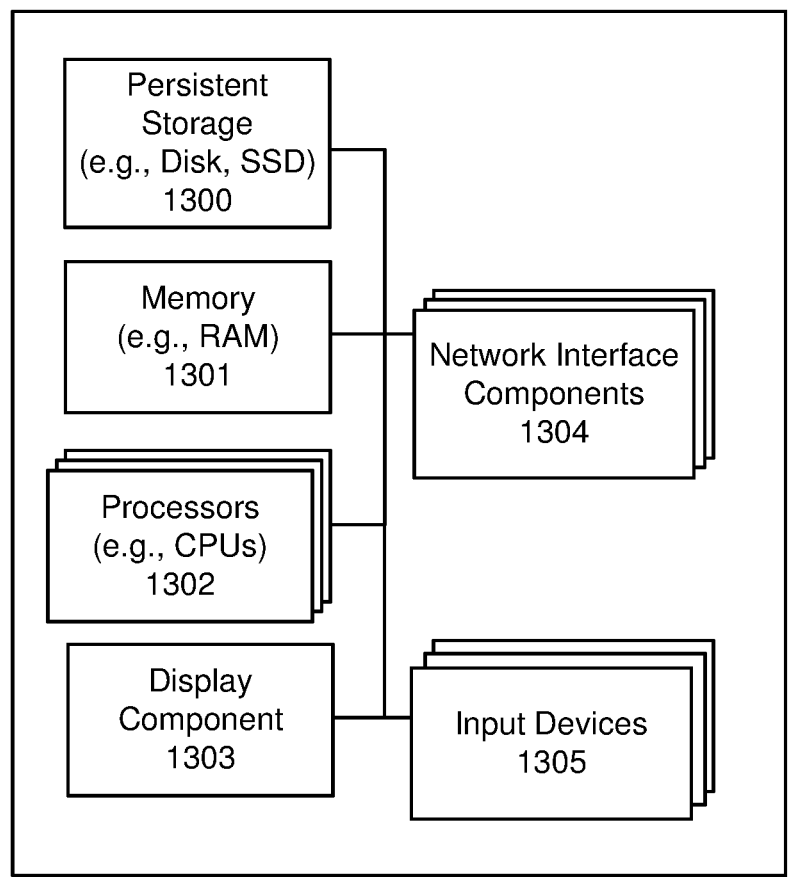
FIG. 13 illustrates an example of some general components of a computing device, in accordance with various embodiments.

FIG. 13 illustrates an example of some general components of a computing device, in accordance with various embodiments. In this particular example, the device includes one or more processors (e.g., central processing units (CPUs) 1302 for executing instructions that can be stored in a storage medium component. The storage medium can include many types of memory, persistent data storage, or non-transitory computer-readable storage media. For example, the storage medium may take the form of random access memory (RAM) 1301 storing program instructions for execution by the processor(s) 1302, a persistent storage (e.g., disk or SSD) 1300, a removable memory for sharing information with other devices and/or the like. The computing device typically can further comprise a display component 1303, such as a monitor, a touch screen, liquid crystal display (LCD), or the like. In various embodiments, the computing device will include at least one input device 1305 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 1304 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for dynamically switching feature redirection between desktops under nested mode in virtual desktop environments, comprising:
    establishing, over a network connection, a first virtual desktop session between a first virtual desktop client operating on a client computing device and a first virtual desktop agent operating in a first virtual desktop on a host server;
    establishing a first connection for exchanging data between a first feature module running in the first virtual desktop client and a second feature module running in the first virtual desktop agent, wherein the first feature module and the second feature module are configured to exchange data over the first connection to redirect a corresponding feature to the first virtual desktop;
    establishing a second virtual desktop session between a second virtual desktop client operating in the first virtual desktop and a second virtual desktop agent operating in a second virtual desktop;
    receiving a first request to redirect a feature to the second virtual desktop;
    in response to the first request, without disconnecting the first virtual desktop session or the second virtual desktop session, establishing a second connection for exchanging data between the first feature module running in the first virtual desktop client and a third feature module running in the second virtual desktop agent, wherein the first feature module and the third feature module are configured to exchange data over the second connection to redirect the feature to the second virtual desktop;
    receiving a second request to redirect the feature to the first virtual desktop;
    in response to the second request, without disconnecting the first virtual desktop session or the second virtual desktop session, re-establishing the first connection for exchanging data between the first feature module running in the first virtual desktop client and the second feature module running in the first virtual desktop agent; and
    redirecting the feature to the first virtual desktop via the first connection.

2. The method of claim 1, further comprising terminating the first connection in response to the first request.

3. The method of claim 1, wherein the first request is produced in response to a user input indicating that the feature is to be redirected to the second virtual desktop.

4. The method of claim 1, further comprising, in response to detecting that the first virtual desktop and the second virtual desktop are in nested mode:
    placing a filter in the first virtual desktop agent for controlling the connection and disconnection of the second feature module with the first feature module; and placing a filter in the second virtual desktop agent for controlling the connection and disconnection of the third feature module with the first feature module.

5. The method of claim 1, wherein data is exchanged over the second connection by exchanging the data between the first virtual desktop client and the first virtual desktop agent over a first protocol virtual channel between the first virtual desktop client and the first virtual desktop agent, exchanging the data between the first virtual desktop agent and the second virtual desktop client in the first virtual desktop, and exchanging the data between the second virtual desktop client and the second virtual desktop agent over a second protocol virtual channel between the second virtual desktop client and the second virtual desktop agent.

6. The method of claim 1, wherein the feature is one of a USB device, a clipboard, multimedia redirection (MMR), or a printer.

7. A computing device for dynamically switching feature redirection between desktops under nested mode in virtual desktop environments, comprising:
at least one processor; and
memory including instructions that, when executed by the at least one processor, cause the computing device to perform the steps of:
establishing, over a network connection, a first virtual desktop session between a first virtual desktop client operating on a client computing device and a first virtual desktop agent operating in a first virtual desktop on a host server;
establishing a first connection for exchanging data between a first feature module running in the first virtual desktop client and a second feature module running in the first virtual desktop agent, wherein the first feature module and the second feature module are configured to exchange data over the first connection to redirect a corresponding feature to the first virtual desktop;
establishing a second virtual desktop session between a second virtual desktop client operating in the first virtual desktop and a second virtual desktop agent operating in a second virtual desktop;
receiving a first request to redirect a feature to the second virtual desktop;
in response to the first request, without disconnecting the first virtual desktop session or the second virtual desktop session, establishing a second connection for exchanging data between the first feature module running in the first virtual desktop client and a third feature module running in the second virtual desktop agent, wherein the first feature module and the third feature module are configured to exchange data over the second connection to redirect the feature to the second virtual desktop;
receiving a second request to redirect the feature to the first virtual desktop;
in response to the second request, without disconnecting the first virtual desktop session or the second virtual desktop session, re-establishing the first connection for exchanging data between the first feature module running in the first virtual desktop client and the second feature module running in the first virtual desktop agent; and
redirecting the feature to the first virtual desktop via the first connection.

8. The computing device of claim 7, wherein the memory further includes instructions that when executed by the at least one processor, cause the computing device to perform the steps of:
terminating the first connection in response to the first request.

9. The computing device of claim 7, wherein the first request is produced in response to a user input indicating that the feature is to be redirected to the second virtual desktop.

10. The computing device of claim 7, wherein the memory further includes instructions that when executed by the at least one processor, cause the computing device to perform the steps of:
in response to detecting that the first virtual desktop and the second virtual desktop are in nested mode:
placing a filter in the first virtual desktop agent for controlling the connection and disconnection of the second feature module with the first feature module; and
placing a filter in the second virtual desktop agent for controlling the connection and disconnection of the third feature module with the first feature module.

11. The computing device of claim 7, wherein data is exchanged over the second connection by exchanging the data between the first virtual desktop client and the first virtual desktop agent over a first protocol virtual channel between the first virtual desktop client and the first virtual desktop agent, exchanging the data between the first virtual desktop agent and the second virtual desktop client in the first virtual desktop, and exchanging the data between the second virtual desktop client and the second virtual desktop agent over a second protocol virtual channel between the second virtual desktop client and the second virtual desktop agent.

12. The computing device of claim 7, wherein the feature is one of a USB device, a clipboard, multimedia redirection (MMR), or a printer.

13. A non-transitory computer readable storage medium for dynamically switching feature redirection between desktops under nested mode in virtual desktop environments comprising one or more sequences of instructions, the instructions when executed by one or more processors causing the one or more processors to execute the operations of:
establishing, over a network connection, a first virtual desktop session between a first virtual desktop client operating on a client computing device and a first virtual desktop agent operating in a first virtual desktop on a host server;
establishing a first connection for exchanging data between a first feature module running in the first virtual desktop client and a second feature module running in the first virtual desktop agent, wherein the first feature module and the second feature module are configured to exchange data over the first connection to redirect a corresponding feature to the first virtual desktop;
establishing a second virtual desktop session between a second virtual desktop client operating in the first virtual desktop and a second virtual desktop agent operating in a second virtual desktop;
receiving a first request to redirect a feature to the second virtual desktop; and
in response to the first request, without disconnecting the first virtual desktop session or the second virtual desktop session, establishing a second connection for exchanging data between the first feature module running in the first virtual desktop client and a third feature module running in the second virtual desktop agent, wherein the first feature module and the third feature module are configured to exchange data over the second connection to redirect the feature to the second virtual desktop;

receiving a second request to redirect the feature to the first virtual desktop;

in response to the second request, without disconnecting the first virtual desktop session or the second virtual desktop session, re-establishing the first connection for exchanging data between the first feature module running in the first virtual desktop client and the second feature module running in the first virtual desktop agent; and redirecting the feature to the first virtual desktop via the first connection.

14. The non-transitory computer readable storage medium of claim 13, further comprising instructions that when executed by the one or more processors cause the one or more processors to execute the operations of:
terminating the first connection in response to the first request.

15. The non-transitory computer readable storage medium of claim 13, wherein the first request is produced in response to a user input indicating that the feature is to be redirected to the second virtual desktop.

16. The non-transitory computer readable storage medium of claim 13, further comprising instructions that when executed by the one or more processors cause the one or more processors to execute the operations of:
in response to detecting that the first virtual desktop and the second virtual desktop are in nested mode:
placing a filter in the first virtual desktop agent for controlling the connection and disconnection of the second feature module with the first feature module; and
placing a filter in the second virtual desktop agent for controlling the connection and disconnection of the third feature module with the first feature module.

17. The non-transitory computer readable storage medium of claim 13, wherein data is exchanged over the second connection by exchanging the data between the first virtual desktop client and the first virtual desktop agent over a first protocol virtual channel between the first virtual desktop client and the first virtual desktop agent, exchanging the data between the first virtual desktop agent and the second virtual desktop client in the first virtual desktop, and exchanging the data between the second virtual desktop client and the second virtual desktop agent over a second protocol virtual channel between the second virtual desktop client and the second virtual desktop agent.

* * * * *